No. 792,615. PATENTED JUNE 20, 1905.
R. H. RAMSEY.
ENGINE.
APPLICATION FILED FEB. 19, 1903.
4 SHEETS—SHEET 3.
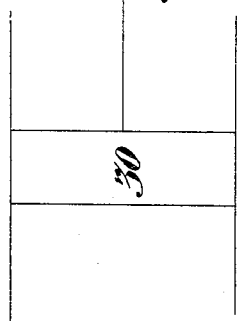
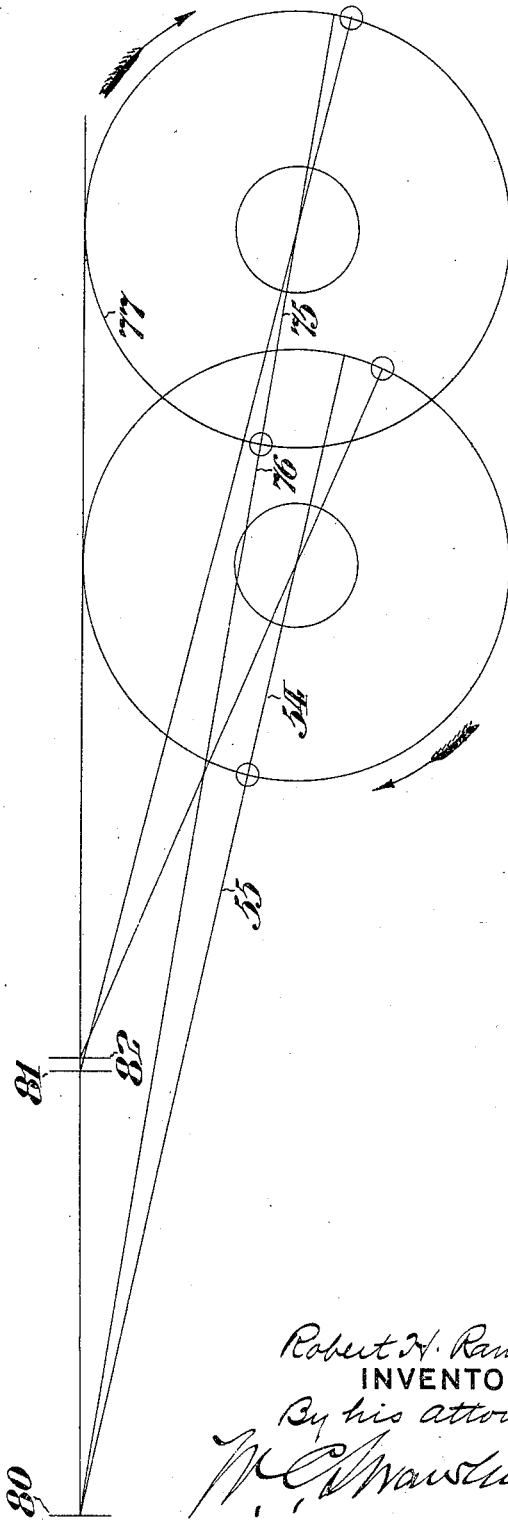
WITNESSES:
INVENTOR: Robert H. Ramsey
By his attorney

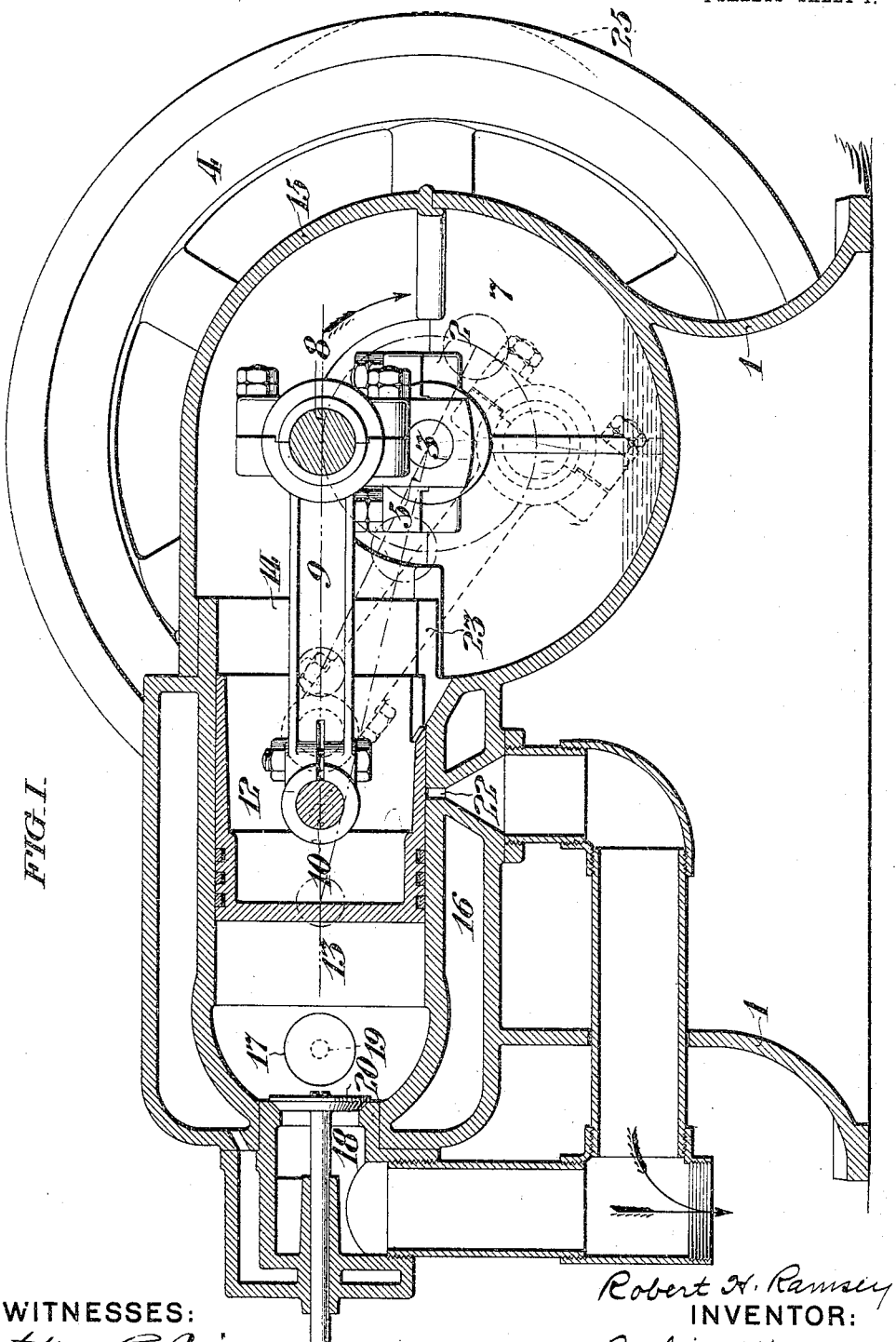

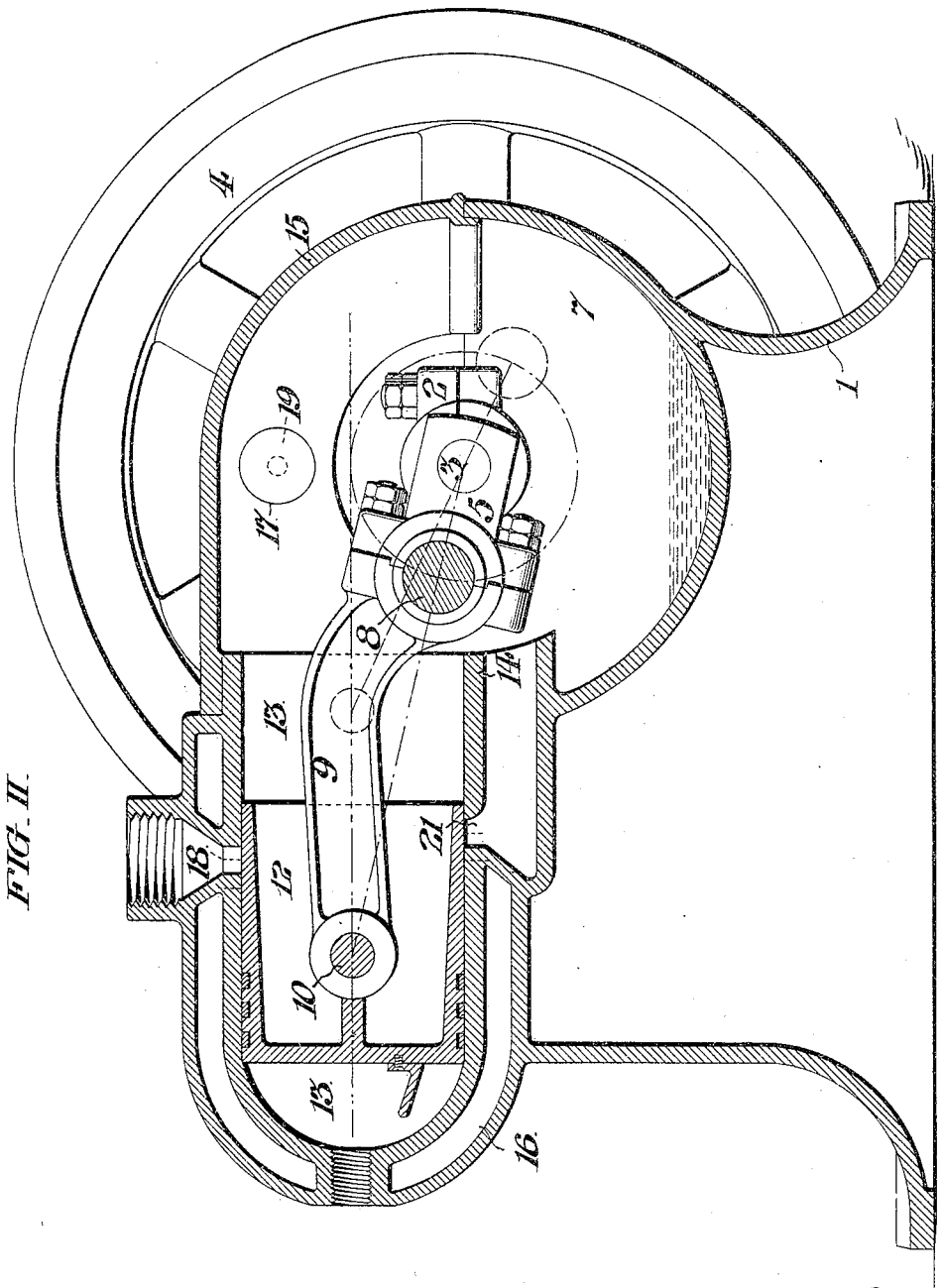

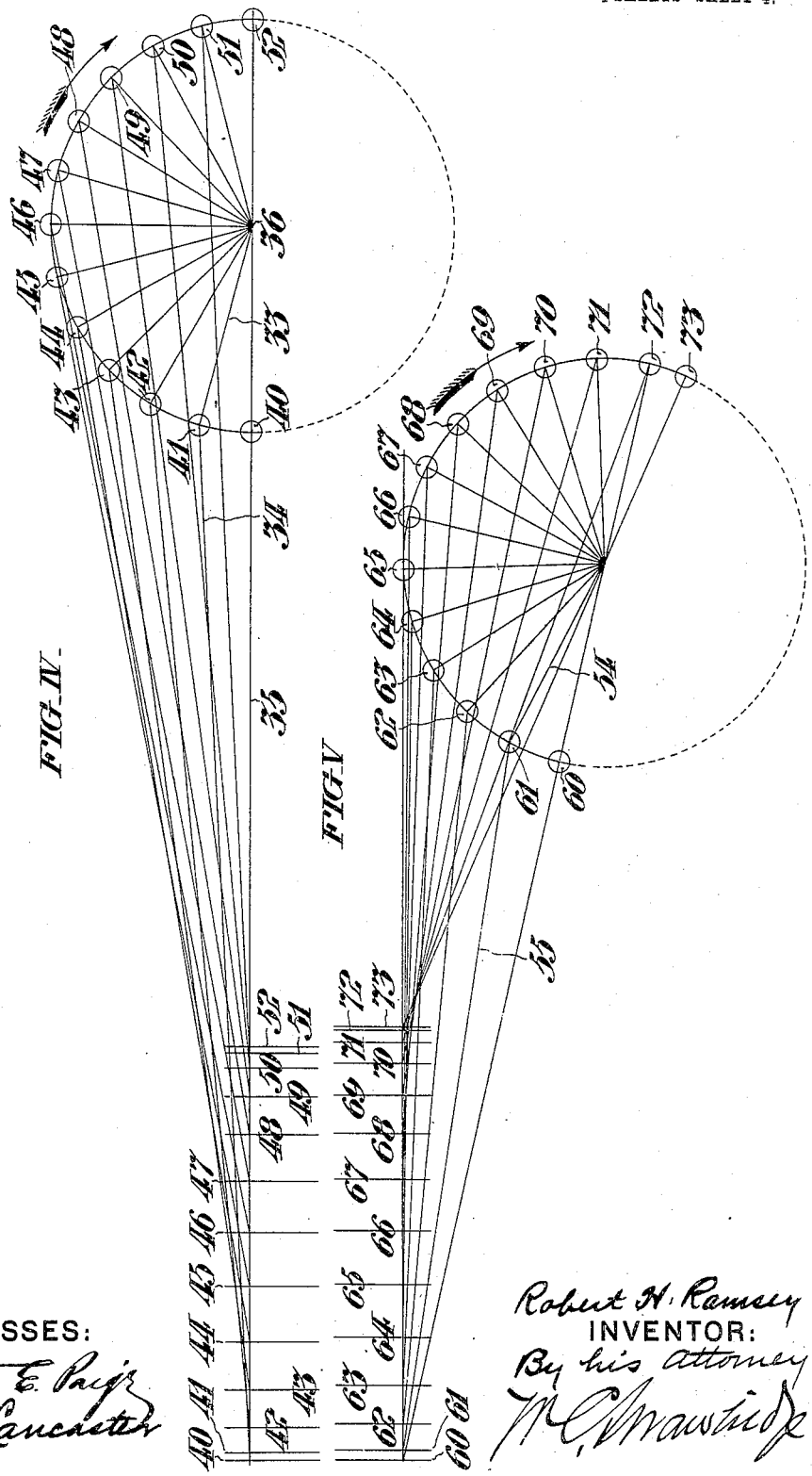

No. 792,615. Patented June 20, 1905.

UNITED STATES PATENT OFFICE.

ROBERT H. RAMSEY, OF PHILADELPHIA, PENNSYLVANIA.

ENGINE.

SPECIFICATION forming part of Letters Patent No. 792,615, dated June 20, 1905.

Application filed February 19, 1903. Serial No. 144,028.

*To all whom it may concern:*

Be it known that I, ROBERT H. RAMSEY, of Philadelphia, in the State of Pennsylvania, have invented certain new and useful Improvements in Engines, whereof the following is a specification, reference being had to the accompanying drawings.

It is the object of my invention to provide crank mechanism whereby the rectilinear motion of the piston during the power stroke may be transmitted with maximum rotative effect to a rotary crank shaft, and, as hereinafter described my improvements are particularly applicable to single acting engines of the internal combustion class.

An understanding of my improvements may be facilitated by reference to the ordinary construction and arrangement of engines of the class specified. In the ordinary single acting engine, the central longitudinal axis of traverse of the piston is radial with respect to the center of rotation of the crank shaft, and consequently the path described by the rod connecting the piston and the crank is symmetrical upon opposite sides of said radial line and the stroke of the piston is precisely limited to twice the length of the crank radius. Moreover, although the ordinary engine connecting rod is made five times as long as the radius of the crank with which it is connected, the relative angularity of the piston, the rod, and the crank, is such that when the piston is approaching its maximum speed and the crank is at its position of maximum leverage, the friction of the cylinder is also at maximum and of course diminishes the amount of force transmitted to the crank.

Generally stated, my improvements comprise such construction and arrangement of a single acting engine, that the central axis of traverse of the piston is tangential to the circular path of traverse of the crank; that the rod connecting the piston and crank is but three and three eighth times the length of the radius of the crank; that the stroke of the piston exceeds twice the length of the crank radius for the purpose of effecting a result which, so far as I am aware, has never before been accomplished; and, that during the time the piston is traveling at maximum speed and under mean pressure, the relation of the piston, connecting rod and the crank is such as to transmit the maximum rotative effort to the crank, with the latter in the position of maximum leverage, and with the cylinder friction at minimum.

The principal advantages of my invention are; First, 25 per cent more of the rectilinear force acting upon the piston is transformed into rotative effort with respect to the crank than is the case with engines as heretofore constructed, so that an engine of a given horse power may be constructed in accordance with my invention of less dimensions than hitherto possible. Second, the length of the piston stroke is so much greater than twice the length of radius of the crank as to permit the employment of an exhaust port which is only uncovered by the piston during that portion of its stroke which is in excess of the ordinary stroke, and, third, a two cycle engine may be run at higher speed than hitherto, because the return of the piston is delayed at the proper time to permit efficient exhaust and recharge of the cylinder.

In the accompanying drawings, Fig. I, is a central longitudinal sectional view of an internal combustion engine conveniently embodying my invention, and particularly adapted for a four cycle mode of operation.

Fig. II, is a central longitudinal sectional view of an internal combustion engine conveniently embodying my invention and particularly adapted for a two cycle mode of operation.

Fig. III shows a modified arrangement of my invention.

Fig. IV, is a diagram showing the standard proportions of the connecting rod and crank of an ordinary engine, wherein the central longitudinal axis of traverse of the piston is radial with respect to the center of rotation of the crank.

Fig. V, is a diagram showing the proportions of a connecting rod and crank constructed and arranged in accordance with my invention.

Fig. VI is a diagram wherein long and short connecting rods are compared, showing the increase of piston travel and crank rotation due to reducing the ratio between the length of radius of the crank and the rod.

There are certain elements which are common to the engines shown in Fig. I and II, as follows:—The engine base 1, supports the bearings 2, for the crank shaft 3, provided with the usual balance wheel 4 and crank 5. Said base 1, comprises the chamber 7, for said crank, whose pin 8, is directly connected by the rod 9, with the pin 10, in the piston 12, which latter is mounted to reciprocate in the cylinder 13. Said cylinder comprises the flange 14, overhanging the crank chamber 7, closed by the cap 15, and said cylinder is provided with the water jacket 16. The inlet for gas and air is indicated at 17 in the cylinder of Fig. I and in the crank casing of Fig. II, and is controlled by the valve 19. Each cylinder is provided with a main exhaust port 18, suitably controlled, for instance, by the valve 20, shown in Fig. I, arranged to be operated in any convenient manner.

In Fig. I, the cylinder 13 is provided with the auxiliary exhaust port 22, which is closed by the piston 12 throughout so much of the power stroke of the latter as is equal to twice the radius of the crank 5, and is only opened by the augmented stroke of the piston characteristic of my invention.

It is to be understood that I do not broadly claim the use of an auxiliary exhaust port as such devices are known, it is to be noted however, that in an ordinary engine the employment of an auxiliary exhaust port diminishes the extent of the power stroke so that the latter is less than twice the radius of the crank, whereas in my invention the auxiliary exhaust port may be employed with a full power stroke, equal to twice the radius of the crank, before the exhaust port is uncovered. Where the auxiliary exhaust port 22, is not employed, the increased piston travel due to my invention is of course utilized in the prolongation of the power stroke with consequent increased efficiency of the engine.

In Fig. II, 21 indicates the admission port through which the charge is delivered to the cylinder 13 from the crank casing 7, being first drawn through the port 17 during the return stroke of the piston toward the left hand side of Fig. II. Although said port 21 is shown at the bottom of the cylinder, it may enter the latter in a higher position, to avoid the passage of oil through it.

It is well known that there are certain requirements to be met in a two cycle engine as distinguished from a four cycle engine, for instance: The exhaust port should be as near the end of the power stroke as possible in order to avoid sacrificing the pressure of the expanding gas during the latter part of the working stroke, and, on the other hand, the exhaust port should remain open long enough to permit the burned gases to effectually escape.

My improvements are particularly advantageous in a two cycle engine in that the exhaust port may be located nearer the outer limit of the power stroke (as indicated by the distance between the dotted and full line illustrations of the port 18 in Fig. II) thus utilizing more of the expansive force of the gas. Moreover, because of the slow movement of the piston, during the period of exhaust, due to my improved crank mechanism, the engine shown in Fig. II will more effectively exhaust the burned gases and recharge with gas. Consequently the power of the engine will be increased, and the engine may run at a higher speed than is possible with the present two cycle engine.

It is to be noted that the engines shown in Figs. I and II, are particularly adapted for the employment of splash lubrication the crank chamber 7, being extended below the cylinder 13, much more than in the ordinary type of engines, and the cylinder flange 14, extending into the crank chamber serving to ward off the greater part of splashed oil so that only sufficient oil passes into the cylinder to lubricate the piston without flooding the cylinder. In Fig. I, the cylinder is drained through the slot 23, in its bottom provided for the rod 9.

It is to be noted that the necessity for slotting the bottom of the cylinder 13 to receive the rod 9, as indicated in Fig. I may be avoided by making the rod 9 eccentric as indicated in Fig. II.

The dotted line 25, in Fig. I, indicates the length which would be necessary for the engine frame if the connecting rod were made in accordance with the standard ratio of five with respect to the crank, and, the difference in the length between the dotted outline and the full outline of the frame shown is of course the saving in length effected by the employment of my invention.

Although the connecting rod 9, extends directly from the crank 5, to the piston 12, in the form shown in Figs. I and II it is to be understood that my invention is equally applicable to engines constructed in accordance with Fig. III, wherein the crank 26, is connected by the rod 27, with the cross-head 28, which latter is mounted to slide parallel with the piston 30, being connected therewith by the rod 31.

Referring to Fig. IV, the crank 33, is connected with the piston, by the rod 34, which is five times the length of the radius of the crank, which as above stated, is the standard proportion determined to be most favorable for the ordinary construction, wherein, the central axis of traverse 35, of the piston, is radial with respect to the center 36, of rotation of the crank 33. For convenient analysis of the relative movements of the connecting rod and piston, in connection with the crank 33; the latter is shown in thirteen different positions, fifteen degrees apart, in said Fig. IV, indicated respectively by the numbers 40 to 52 inclusive, and, the corresponding positions of the piston end of the connecting rod 34, are indicated by the same numerals. The line 40, at the left hand side of said figure represents the extreme limit of the stroke of the piston wherein the crank 33, and connecting rod 34, are in alinement on dead centers.

Fig. V shows a crank 54, of the same radius as the crank 33, but provided with a connecting rod 55, constructed and arranged in accordance with my invention, and, for convenience of comparison with the ordinary connecting rod and crank shown in Fig. IV, the crank 54, is likewise shown in a series of positions, indicated by the numbers 60 to 73 inclusive; the corresponding positions of the piston end of the connecting rod 55, being indicated by the same numerals. The line 60, which in Fig. V, represents the extreme limit of stroke of the piston, is shown in alinement with the corresponding line 40, in Fig. IV. In Fig. V, the length of the piston stroke being from the dead center position 60, to the dead center position 73, and, in Fig. IV, the length of the piston stroke being from the dead center position 40 to the dead center position 52; comparison of the two diagrams shows that whereas, the distance between the extremes 40, and 52, of the piston travel in Fig. IV, is but twice the radius of the crank 33, the distance between the extremes 60, and 73, in Fig. V, is six per cent greater; or in other words, my invention is advantageous over that heretofore known in that it permits a longer power stroke both of the piston and of the crank with a given length of the latter.

Moreover, whereas, the return stroke of the piston, from right to left, in Fig. IV, requires the rotation of the crank 33, through the arc of 180 degrees, indicated by the dotted line in said figure; the return stroke of the piston through the six per cent greater distance, shown in Fig. V, requires the traverse of the crank 54, through an arc of but 168½ degrees, as indicated by the dotted line in said Fig. V. In other words, the piston transmits power to the crank pin during a greater proportion of the rotation of the crank shaft than heretofore, by reason of my invention, the angular travel of the crank during its return stroke being largely reduced, as aforesaid.

In addition to the advantages of a longer power stroke and a quicker return stroke of the piston attained by the construction and arrangement of my invention, it is to be noted in comparison of Figs. IV and V that whereas, in the old device shown in Fig. IV, when the crank 33, reaches the position 45, wherein it presents the greatest leverage for the application of thrust from the piston, and the piston is at maximum speed under average pressure; the friction of the piston in the cylinder is increased to the maximum by the angular relation existing between the piston and the connecting rod 34, and consequently lessens by absorption the amount of power transmitted to the crank pin. On the contrary, when the crank 54, shown in Fig. V, reaches the position 65, in which it presents the greatest leverage to receive the thrust of the connecting rod 55, the latter is in alinement with the central axis of traverse of the piston, and the cylinder friction is consequently reduced to the minimum, and, such advantageous relation of the parts continues throughout the region in which the piston is moving at maximum speed under mean pressure.

Moreover, the angular relation of the connecting rod and piston constructed, as in Fig. V, in accordance with my invention, is such as to reduce the cylinder friction throughout all of the power stroke of the piston, as compared with the known construction, indicated in Fig. IV, and, consequently my invention is in this respect also more favorable to the effective transmission of power from the piston to the crank. The comparative angularity of the old and new devices may be ascertained from Figs. IV and V, to be as follows:—

|  | Old. | New. |
|---|---|---|
| During the power stroke the piston travel at less than a 10 degrees angle is | 50% | 88% |
| At less than a 9 degrees angle is | 30% | 85% |
| At less than a 6 degrees angle is | 13¼% | 73% |
| At less than a 3 degrees angle is | 3¼% | 50% |
| At less than a 1 degree angle is | 1¼% | 31% |

Aside from the advantageous angular relation existing between the piston and the connecting rod in my invention, as above considered, the angular relation existing between the connecting rod and the crank constructed in accordance with my invention, is advantageous over that heretofore known in that the effective leverage of the crank throughout the power stroke is greater in the new device than in the old, as may be ascertained by comparing Figs. IV, and V, with respect to the percentages of length of the cranks 33, and 54, which are effective in the several positions shown, as follows:—

| Old Device. | | New Device. | | Gain. |
|---|---|---|---|---|
| Position. | Leverage. | Position. | Leverage. |  |
| 40 | .0 | 60 | 0.0 | 0.0 |
| 41 | 30.31% | 61 | 32.62% | 7.08% |
| 42 | 57.81% | 62 | 60.92% | 5.11% |
| 43 | 79.06% | 63 | 82.19% | 3.93% |
| 44 | 93.75% | 64 | 95.62% | 1.96% |
| 45 | 100.00% | 65 | 100.00% | 0.0 |
| 46 | 98.12% | 66 | 98.12% | 0.0 |
| 47 | 89.69% | 67 | 90.00% | 0.21% |
| 48 | 76.25% | 68 | 77.81% | 2.01% |
| 49 | 59.69% | 69 | 63.12% | 5.42% |
| 50 | 41.25% | 70 | 48.12% | 14.28% |
| 51 | 20.62% | 71 | 31.25% | 34.02% |
| 52 | 00.00 | 72 | 14.06% | all |

Again comparing the old device of Fig. IV, with the new device of Fig. V; the increase in length of stroke of the piston, due to the arrangement of the parts in accordance with my invention, being six per cent; it is important to note that, the two cycle engine shown in Fig. II, which is constructed in accordance with Fig. V has a power stroke (prior to the opening of the exhaust port 18 by the piston 12) approximately 10% longer than in an engine, with the same length of crank, made in accordance with Fig. IV; and yet, the exhaust port in Fig. II, will remain open during the same period of crank travel. The result last named is due to the sluggish movement of the piston in the region of the outer extremity 73 of its stroke, because the arc of movement of the connecting rod 55, at the outer extremity of its stroke more nearly conforms to the arc of movement of the crank than does the arc of movement of the longer connecting rod 33, at its outer extremity of movement.

The aforesaid sluggish movement of the piston connected with crank 54, as above described, may be perhaps more fully realized by noting that the piston connected with the rod 34, shown in Fig. IV, stops at the point 52, and immediately begins its return toward the point 40; while, on the contrary, after the piston connected with the rod 55, passes the same point on its outer stroke, to the right, it requires sixty degrees of rotation or one sixth of a revolution of the crank 54, before the piston is returned to said point 52.

In a two cycle engine, constructed and arranged in accordance with my invention as in Fig. II, the greater travel of the piston on the forward stroke and its sluggish movement in the region of the outer extremity 73 of its traverse renders it possible to run at extraordinary speed, as it affords more time to clear the cylinder of refuse matter and recharge it with a purer mixture. For instance, if the exhaust ports were arranged in two two cycle engines, constructed respectively in accordance with Figs. IV, and V, so as to give each engine the same length of power stroke before the pistons open the exhaust ports; the exhaust port would remain open during but 129 degrees of travel of the crank 33, shown in Fig. IV, whereas, the exhaust port would remain open during 146 degrees of travel of the crank 54, shown in Fig. V.

After the piston has passed the point where this sluggish movement occurs, as already described, the remainder of its return stroke is very rapid. The explanation of this is easily understood. During the forward movement of the piston the crank travels approximately 190 degrees of the crank circle, while on the return movement it has only 170 degrees of the circle to travel. Hence on the return movement, while the crank is traveling 170 degrees of the circle, the piston must move considerably faster in order to cover the same distance which it covered on the forward movement while the crank was traveling 190 degrees. This acceleration of speed is still greater because, during the sluggish movement of the piston at the outer extremity 73 of its traverse, the crank travels about 10 degrees, so that in reality the piston completes the return movement during approximately 160 degrees of crank travel.

An important result of this rapid return movement of the piston is the quick compression of the charge of air and gas that has entered the cylinder. The increase of pressure during the compression stroke causes the temperature to rise, and in a hydrocarbon engine a high temperature of the gases is desirable at the moment of ignition. This being the case, the more rapidly the compression takes place, the less loss of heat there will be from radiation, and the greater will be the resulting economy and efficiency.

The advantages incident to the action of my invention shown in Figs. I, II and V, may be enumerated as follows:—

1st. It increases the length of piston travel.

2nd. It pushes the crank further around its path.

3rd. It applies the power to the crank pin so as to give the crank an earlier and better leverage during the power stroke.

4th. It reduces the friction between the cylinder and piston.

5th. It gives to the piston a slower movement at the beginning of the return stroke, thus facilitating the operation of exhaust and inlet ports.

6th. It reduces the length of horizontal engines (or height of vertical engines) in the following proportions:—

$3\frac{1}{2}$ inches for an engine with 2" crank radius.

$8\frac{11}{16}$ inches for an engine with 5" crank radius.

$17\frac{3}{8}$ inches for an engine with 10" crank radius.

7th. A quicker compression of the charge and consequent decreased loss of heat by radiation.

The above enumerated advantages of my invention are the resultants of three factors, first, the location of the center of rotation of the crank so far to one side of the central axis of traverse of the piston that the circular path of traverse of the crank is tangential or approximately tangential thereto, second, the reduction in the ratio between the length of radius of the crank and the length of the rod connecting the crank with the piston, and, third, the rotation of the crank in the particular direction specified. It may be observed that the object of my invention would be defeated and the engine rendered practically worthless if operated in the reverse direction.

That the aforesaid advantages are due in large measure to the reduced ratio between the lengths of the connecting rod and crank is evident upon examination of Fig. VI, wherein, a crank 75, and connecting rod 76, of the old standard ratio shown in Fig. IV, are so disposed that the circular path 77, of the crank is in tangential relation to the central axis of traverse of the piston at a point on the said circular path which is touched by the crank during the forward or power stroke of the piston, and the stroke of the piston is from the line 80 to the line 81. The crank 54, and connecting rod 55, similar to those shown in detail in Fig. V, being compared with the crank 75, and connecting rod 76, in Fig. VI, it appears that although the cranks 75, and 54, are of the same radius, the reduced ratio of length of the connecting rod 55, with respect to the crank 54, is such that the stroke of the piston connected therewith is from the line 80, to the line 82; the increase of stroke from the line 81, to the line 82, being due solely to the relative shortening of the connecting rod 55. However, it is important to note that the use of the short connecting rod is only rendered advantageous in connection with a crank whose path of rotation is tangent to the central longitudinal axis of travel of the piston during its power stroke; the employment of a short connecting rod being impracticable in an engine arranged in accordance with Fig. IV, on account of the disadvantageous angular relation of the piston, connecting rod and crank during the power stroke.

It is to be understood that I do not desire to limit myself to the precise details of construction and arrangement which I have shown as it is obvious that various modifications may be made therein, without departing from the essential features of my invention.

I claim—

1. In a single acting engine, the combination with a cylinder and piston, of a rotary crank whose direction of traverse is outward from said cylinder in the region of the longitudinal axis of the latter, and a rod connecting said crank and piston, the longitudinal axis of traverse of said piston being tangential with respect to the circular path of traverse of said crank, substantially as set forth.

2. In a single acting engine, the combination with a cylinder and piston, of a rotary crank whose direction of traverse is outward from said cylinder in the region of the longitudinal axis of the latter, and a rod, of length less than four times the radius of said crank, connecting said crank and piston, the longitudinal axis of traverse of said piston being tangential with respect to the circular path of traverse of said crank, substantially as set forth.

3. In a single acting engine, the combination with a cylinder and piston, of a crank having a circular path of traverse to which the central longitudinal axis of said cylinder is tangential at a point on the said circular path which is touched by the crank during the forward or power stroke of the piston, a rod, of length less than four times the radius of said crank, connecting said crank and piston, whereby the piston stroke exceeds twice the length of the crank radius, and an exhaust port in said cylinder controlled by said piston, said port being opened by the traverse of said piston in excess of twice the crank radius, substantially as set forth.

4. In a single acting engine, the combination with a cylinder and piston, of a rotary crank whose center of rotation is eccentric with respect to the longitudinal axis of said cylinder, and whose direction of traverse is outward from said cylinder in the region of said axis, a rod of less length than four times the radius of said crank connecting said crank and piston, whereby the piston stroke exceeds twice the length of the crank radius, and an exhaust port in said cylinder controlled by said piston, said port being closed during the traverse of said piston to the extent of twice the crank radius, and opened throughout 60 degrees of rotary traverse of said crank, substantially as set forth.

5. In a single acting engine, the combination with a cylinder and piston, of a rotary crank whose center of rotation is eccentric with respect to the longitudinal axis of said cylinder and whose direction of traverse is outward from said cylinder in the region of said axis, a rod of less length than four times the radius of said crank connecting said crank and piston, whereby the piston stroke exceeds twice the length of the crank radius, an exhaust port in said cylinder, a valve arranged to control said port independently of said piston, and another exhaust port in said cylinder controlled by said piston, the last named port being closed throughout the traverse of the piston to the extent of twice the crank radius and opened by the traverse of said piston in excess of twice the crank radius, substantially as set forth.

6. In a single acting engine, the combination with a cylinder and piston, of a rotary crank whose center of rotation is eccentric with respect to the longitudinal axis of said cylinder, and whose direction of traverse is outward from said cylinder in the region of the longitudinal axis of the latter, the longitudinal axis of traverse of said piston being tangential with respect to the circular path of traverse of said crank, and a rod of less length than four times the radius of said crank connecting said crank and piston, whereby the rotary motion of said crank, corresponding to the outward power stroke of said piston, exceeds, by 20 degrees, the rotary motion of said crank corresponding to the inward stroke of said piston, substantially as set forth.

7. In a single acting engine, the combination with a cylinder and piston, of a rotary crank whose center of rotation is eccentric with respect to the longitudinal axis of said cylinder, and whose direction of traverse is outward from said cylinder in the region of the longitudinal axis of the latter, a rod of length less than four times the radius of said crank connecting said crank and piston, a casing inclosing said crank and comprising an oil reservoir at the bottom thereof, and said cylinder projecting within said crank casing overhanging said oil reservoir, substantially as set forth.

8. In a single acting engine, the combination with a cylinder and piston, of a rotary crank whose center of rotation is eccentric with respect to the longitudinal axis of said cylinder, and whose direction of traverse is outward from said cylinder in the region of said axis, and a rod connecting said crank and piston, whose body portion is eccentrically disposed intermediate of its ends in such relation to the cylinder as to clear the outer extremity of the latter, substantially as set forth.

9. In a single acting engine, the combination with a cylinder and piston, of a rotary crank whose center of rotation is eccentric with respect to the longitudinal axis of said cylinder, and whose direction of traverse is outward from said cylinder in the region of said axis, and a rod connecting said crank and piston whose body portion is eccentrically disposed intermediate of its ends in such relation to the piston as to clear the outer extremity of the latter, substantially as set forth.

10. In a single acting engine, the combination with a cylinder and piston, of a rotary crank and connecting rod operatively related to said piston, said elements being so constructed and arranged that the connecting rod and crank are disposed at right angles to each other when the connecting rod centers coincide with the central longitudinal axis of the cylinder during the power stroke of the piston, substantially as set forth.

11. In a single acting engine, the combination with a cylinder and piston, of a rotary crank and connecting rod operatively connected with said piston, said elements being so constructed and arranged that the angle between the connecting rod axis and the central longitudinal axis of the cylinder constantly diminishes from the commencement of the power stroke until the piston reaches the position at which the pressure is at its average value, substantially as set forth.

12. In a single acting engine, the combination with a cylinder and piston, of a crank having a circular path of traverse to which the central longitudinal axis of said cylinder is tangential at a point on said circular path which is touched by said crank during the forward or power stroke of said piston, and a rod, which is less than four times the length of said crank, connecting said crank and piston so that after the piston has completed that part of the return stroke in the region of the outer extremity 73 of its traverse where its movement is sluggish, the velocity of the piston is materially accelerated, and the compression of the charge is accomplished with great rapidity and comparatively no loss of heat by radiation.

In testimony whereof I have hereunto signed my name, at Philadelphia, Pennsylvania, this 18th day of February, 1903.

ROBERT H. RAMSEY.

Witnesses:
 THOS. K. LANCASTER,
 CYRUS N. ANDERSON.